United States Patent [19]

Yanagihara et al.

[11] 4,368,275
[45] Jan. 11, 1983

[54] ISOCYANURATE-VINYL ALCOHOL-VINYL ESTER CHROMATOGRAPHIC PACKING

[75] Inventors: Yuzo Yanagihara; Kohji Noguchi; Makoto Honda, all of Kawasaki, Japan

[73] Assignee: Asahi Kasei Kogyo Kabushiki Kaisha, Osaka, Japan

[21] Appl. No.: 272,230

[22] Filed: Jun. 10, 1981

[30] Foreign Application Priority Data

Jun. 25, 1980 [JP] Japan .................................. 55/85243
Dec. 26, 1980 [JP] Japan ................................ 55/183703

[51] Int. Cl.³ ............................................. C08F 8/12
[52] U.S. Cl. ...................................... 521/52; 210/656; 525/60
[58] Field of Search ............................ 525/60; 521/52

[56] References Cited

U.S. PATENT DOCUMENTS 3,586,626  6/1971  Heitz et al. ............................ 210/31
4,104,208  8/1978  Kido et al. ............................ 525/61

FOREIGN PATENT DOCUMENTS 2034328  4/1980  United Kingdom .

*Primary Examiner*—Stanford M. Levin
*Attorney, Agent, or Firm*—Sprung, Horn, Kramer & Woods

[57] ABSTRACT

A granular crosslinked copolymer suitable as a high speed liquid chromatographic packing and especially as a gel permeation chromatographic packing is disclosed. In a preferred embodiment of the invention the packing is a copolymer essentially consisting of (I) units of at least one vinyl alcohol, (II) units of at least one vinyl ester of a carboxylic acid and (III) units of at least one crosslinking monomer having an isocyanurate ring, the ratio of the units (I) to the units (II) in the copolymer being within the range satisfying the following equation:

$$\text{about } 0.4 \leq a/(a+b) \leq \text{about } 0.8$$

wherein
a and b are molar ratios of the units (I) and (II), respectively, in the total units (I), (II) and (III) of the copolymer, and a process for preparing the same by suspension polymerization is disclosed.

24 Claims, 5 Drawing Figures

ISOCYANURATE-VINYL ALCOHOL-VINYL ESTER CHROMATOGRAPHIC PACKING

BACKGROUND OF THE INVENTION

1. Field of the Invention

This invention relates to a novel granular crosslinked copolymer, a packing for high speed liquid chromatography (abbreviated "HLC") comprising this crosslinked copolymer, and to a process for the production thereof. More specifically, this invention relates to a packing for liquid chromatography (abbreviated "LC") suitable for a high speed and high degree separation or analysis of substances dissolved in an aqueous solution according to the separation mechanism principally of gel permeation chromatography (abbreviated "GPC"), which comprises a copolymer essentially consisting of (I) units of at least one vinyl alcohol, (II) units of at least one vinyl ester of a carboxylic acid and (III) units of at least one crosslinking monomer having an isocyanurate ring, and to a process for the production thereof.

DESCRIPTION OF THE PRIOR ART

LC is a method of separation or analysis utilizing the difference in elution speed created by some interactions between the solid phase, i.e., a packing and the components to be separated dissolved in the moving liquid phase. Particularly, a method where a packing having a small particle size and great mechanical strength is employed and high degree of separation or analysis is effected by passing a solvent there-through at a high speed within a short period of time is generally called as HLC and utilized in various fields.

GPC is one kind of LC utilizing the principle that a component having a molecular size smaller than the size of pores in a packing (to be referred to as "gel") permeates into the gel according to its molecular size, while a component having a larger molecular size passes through outside the gel, whereby the components can be eluted with a solvent successively in the order of the component having a larger molecular size.

GPC may be classified by the solvent employed for the separation or the analysis into an organic medium system and an aqueous medium system. Of these two systems, the aqueous medium system GPC can be used for the separation or the analysis of water-soluble synthetic polymers, saccharides, amino acids and proteins. Above all, it attracts attention in biochemical and medical fields as a simple analytical method, which can advantageously be utilized for the analysis of, for example, serum without the sample pre-treatment or the change of the solvent during the analysis, as required in the conventional LC by utilizing adsorption and distribution, and also with a greater amount of information. Particularly, the components in blood and urine are said to be closely related with diseases of kidney or liver or symptoms such as carcinoma. Thus, it is strongly desired to develop gels for HLC, especially gels for an aqueous medium system high speed GPC, which are suitable for the separation of the analysis of these components.

There is known and frequently utilized as the gel for an aqueous medium system GPC a gel prepared by crosslinking dextran with epichlorohydrin (trade name "Sephadex," a product of Pharmacia Fine Chemicals AB, Sweden). But this gel is a so-called soft gel whose pores utilized for the separation are constituted of crosslinked networks but the mechanical strength of the gel is low. Thus, this gel could not be used as the gel for high speed GPC.

It is also known that there can be obtained a gel of an aqueous medium type by the saponification of the copolymer particles of vinyl acetate and 1,4-butanediol divinyl ether, as disclosed in U.S. Pat. No. 3,586,626. However, as admitted by W. Heitz, the inventor of this U.S. Patent, the copolymerizability of the monomers employed for this gel is low [see W. Heitz, J. Chromatogr. 53, 37, 1970], and therefore the gel formed does not have sufficient strength and cannot practically be used for HLC.

Further, it is reported that a gel of an aqueous medium type having greater mechanical strength can be prepared by saponifying the copolymer particles of, for example, diethylene glycol dimethacrylate or diglycidyl methacrylate with vinyl acetate and then crosslinking the saponified copolymer, as disclosed in U.S. Pat. No. 4,104,208. However, such a preparation method is complicated and it is difficult to obtain the gel having constant quality with good reproducibility.

Still further, it is known that a hard polyvinyl alcohol gel can be obtained by saponifying a copolymer of vinyl acetate and a crosslinking agent having a triazine ring structure to such an extent that the ester absorption of the infrared absorption spectrum at 1730 cm$^{-1}$ completely disappears, as described in British Pat. No. 2,034,328 A. However, according to the research by the present inventors, the gel obtained by such a method has low mechanical strength, and accordingly the gel is not suitable for high speed GPC where the gel having a smaller particle size, for example, a weight average particle diameter less than about 20 µm is used under high pressures although the gel may be used in the commercial separation where the gel having a greater particle size and not particularly requiring great mechanical strength may be used as in the desalination of an aqueous polymer solution.

In order to be useful as the gel for an aqueous medium system high speed GPC, the gel is required to have pores strictly controlled corresponding to the molecular sizes of the components to be separated as well as to have a small particle size with sufficient mechanical strength, and furthermore to be hydrophilic with low adsorbability of the components to be separated in an aqueous solution.

In view of the state of the art as described above, the present inventors have made extensive investigations directed to developing gels for an aqueous medium system GPC which satisfy the above described requirements. As a result, a gel having principally hydroxyl groups, ester groups and units of a crosslinking monomer in the polymer skeleton, having pores suitable for the separation or the analysis of objective substances in an aqueous solution, and also having mechanical strength sufficient to stand high speeds or high pressures and a process for preparing the same have been discovered.

SUMMARY OF THE INVENTION

According to the present invention in one embodiment there is provided a totally porous packing for high speed liquid chromatography comprising a granular crosslinked copolymer essentially consisting of (I) units of at least one vinyl alcohol, (II) units of at least one vinyl ester of a carboxylic acid and (III) units of at least one crosslinking monomer having an isocyanurate ring, the ratio of the units (I) to the units (II) in the copolymer being within the range satisfying the following equation:

about $0.4 \leq a/(a+b) \leq$ about 0.8 wherein
a and b are molar ratios of the units (I) and (II), respectively, in the total units (I), (II) and (III) of the copolymer.

The present invention in another embodiment provides a totally porous packing for high speed liquid chromatography comprising a granular crosslinked copolymer essentially consisting of (I) units of at least one vinyl alcohol, (II) units of at least one vinyl ester of a carboxylic acid and (III) units of at least one crosslinking monomer having an isocyanurate ring, the ratio of the units (I), (II) and (III) in the copolymer is within the range satisfying the following equation:

about $0.20 \leq 3c/(a+b+3c) \leq$ about 0.40 wherein
a and b are the same as defined above, and
c is the molar ratio of the units (III) in the total units (I), (II) and (III) of the copolymer.

In still another embodiment, the present invention provides a process for preparing the above-described packings.

DETAILED DESCRIPTION OF THE INVENTION

Figure 1:
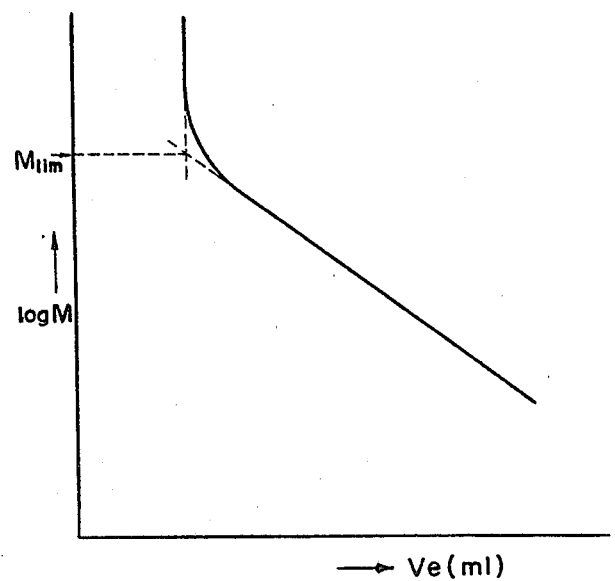
FIG. 1 is a calibration curve for a GPC gel in accordance with the present invention and illustrates the definition of $M_{lim}$.

The gel for use in an aqueous medium system high speed GPC must have mechanical strength resistant to high speeds or high pressures as well as hydrophilicity. The hydrophilicity of the gel of the present invention is due to the hydroxyl groups contained in the polymer skeleton. Such hydroxyl groups can be formed by the ester exchange or the saponification of the ester groups in a copolymer of at least one vinyl ester of a carboxylic acid and at least one crosslinking monomer having an isocyanurate ring. As the result of investigations by the present inventors, however, the mechanical strength of a gel is decreased when all the ester groups are ester-exchanged or saponified. When unaltered ester groups are too many, the hydrophilicity of the gel is reduced and the components dissolved in an aqueous solution becomes easy to adsorb. It has now been found desirable to carry out the ester exchange reaction or the saponification to such an extent that about 40 to about 80 percent of the ester groups are converted to hydroxyl groups. The ester exchange ratio or the saponification ratio Y ($0 \leq Y \leq 1$) is represented by the following equation (1):

$$Y = a/(a+b) \qquad (1)$$

wherein
a and b are molar ratios of (I) the units of at least one vinyl alcohol and (II) the units of at least one vinyl ester of a carboxylic acid, respectively, in the copolymer,
that is, Y indicates the ratio of the units (I) to the units (II) in the copolymer.

a and b can be calculated from the density of hydroxyl groups (to be referred to as "$q_{OH}$") in the gel and the amount of (III) the units of at least one crosslinking monomer having an isocyanurate ring. $q_{OH}$ indicates the equivalent of the units (I) per unit weight of the gel and can be determined by reacting the gel with acetic anhydride in a pyridine solvent, measuring the amount of acetic anhydride consumed in the reaction with the hydroxyl groups or the change in the weight of the gel and calculating the concentration of the hydroxyl groups from this measured value. For example, when 1 millimol of acetic anhydride is consumed in the reaction with 1 g of a dry gel, the $q_{OH}$ of this gel is 1 meq/g. The species of the units of the crosslinking monomer having an isocyanurate ring can be identified by the infrared absorption spectrum thereof and their amount can be determined from the content of nitrogen obtained by the elemental analysis of the gel. In other words, a can be obtained from $q_{OH}$ and b from the value obtained by subtracting the total amount of the units (I) and (III) from the total amount of the units (I), (II) and (III) in the gel, respectively. The chemical structure of the vinyl carboxylate groups can be confirmed by identifying the carboxylic acid formed by the complete ester exchange reaction or saponification of the gel. When the conditions for the preparation of the gel are known, it is also possible to calculate Y from the composition of the starting materials and $q_{OH}$ of the gel formed. It is preferred that the ester exchange ratio or the saponification ratio is in the range of about 0.45 to about 0.75. While $q_{OH}$ varies depending on the vinyl ester of the carboxylic acid employed as the starting material, the degree of crosslinking and the ester exchange ratio or the saponification ratio, it is generally 3 to 11 meq/g in the present invention. Thus, the gel according to the present invention which has simultaneously the respective units of the vinyl alcohol, the vinyl ester of the carboxylic acid and the crosslinking monomer having an isocyanurate ring, has excellent characteristic features as the gel for high speed GPC. This may be considered to be due to the fact that the units of residual ester groups in the gel contribute to the maintenance of the mechanical strength of the gel and also that these units are greater in hydrophilicity than the units of the crosslinking monomer, whereby the adsorbability of the gel may be decreased than in the case when the same mechanical strength is maintained only by the crosslinking monomer.

Among the gels prepared by the ester exchange or the saponification of a copolymer of the vinyl ester of a carboxylic acid and the crosslinking monomer having an isocyanurate ring, the gel prepared by using a larger amount of the crosslinking monomer is greater in the mechanical strength. However, since the crosslinking monomer has no hydroxyl group and there cannot be formed any hydroxyl group by hydrolysis, the gel of a copolymer containing a greater amount of the units of the crosslinking monomer in the polymer skeleton is decreased in hydrophilicity. Thus, in order to be useful as the gel for high speed GPC, the gel must contain the isocyanurate units in an amount within the optimum range. It is preferred that the degree of crosslinking (to be referred to as "X") falls within the range about $0.2 \leq X \leq$ about 0.4. X is represented by the following formula (2):

$$X = 3c/(a+b+3c) \quad (2)$$

wherein a and b are the same as defined above, and c is the molar ratio of the above-described units (III) in the units (I), (II) and (III) of the copolymer.

In the above formula, a and b can be determined by the method as described above and c from the elemental analysis values of the gel or of the esterified gel. When the conditions for the preparation of the gel are known, X can easily be determined by the calculation from the mols of the vinyl ester of the carboxylic acid and the crosslinking monomer used in the polymerization substituted for (a+b) and c in the above formula, respectively.

With X within the above-specified range, the gel having a small particle size has sufficient strength to stand use under high pressure and high speed conditions. Such a gel is also sufficiently hydrophilic and difficult to adsorb the components in an aqueous solution, especially proteins and amino acids to a great advantage for use in high speed GPC. Further, it is especially preferred that the gel of the present invention satisfies simultaneously the above-specified ranges of both X and Y.

With the conventional soft gel, in order to increase an exclusive molecular weight (to be referred to as "$M_{lim}$"), i.e., a minimum molecular weight of a substance which cannot permeate into the pores of the gel, a degree of crosslinking must be decreased to expand the network, which inevitably leads to increase a water regain (to be referred to as "$W_R$"), resulting in a disadvantageously reduced mechanical strength. Particularly when the particle size of the gel is small, unfavorable effects such as pressure loss through a packed column due to the decreased mechanical strength may be caused. Thus, gels having a particle diameter of at least 50 μm are generally employed.

In contrast, the gel of the present invention has a $W_R$ of about 0.5 to about 2.0 g·water/g·dry gel regardless of $M_{lim}$, and accordingly, even the gel with a high $M_{lim}$ can be used for high speed GPC. This is noteworthy with gels of an aqueous medium type for high speed GPC where gels which have a particle diameter of at most 20 μm and are required to have sufficient mechanical strength can be employed. $W_R$ is defined as the amount (g) of water which one gram of dried gel can contain therein when the gel is equilibrated with water, and is a measure for the amount of pores in the gel which exerts GPC function. With increased $W_R$ the weight of portions for the polymer skeleton per unit volume of the gel in water, i.e., the weight of the gel as such is relatively decreased. Thus, if $W_R$ is too large, the mechanical strength of the gel in water is reduced and it is impossible to increase the flow rate, resulting in a pressure loss through the column. On the other hand, when $W_R$ is too small, the amount of pores in the gel having GPC function is decreased to reduce the separability of the gel. Accordingly, it is critical for the gel of an aqueous medium type for high speed GPC to have a $W_R$ within an appropriate range.

It is preferred that the gel for high speed GPC having a structure of this invention has a $W_R$ of about 0.5 to about 2.0 g·water/g·dry gel, especially about 0.8 to about 2.0 g·water/g·dry gel for practical purposes. The gel according to this invention can have a $W_R$ within such a range. $W_R$ is determined as follows:

A gel dipped in water in a fully equilibrated state is centrifuged to remove water adhering to the surface of the gel, and its weight ($W_1$) is measured. The gel is dried and its dry weight ($W_2$) is measured. $W_R$ is calculated in accordance with the following equation:

$$W_R = (W_1 - W_2)/W_2$$

The $M_{lim}$ of the gel of the present invention may be varied within a wide range. As described above, $M_{lim}$ indicates the minimum molecular weight of a substance which cannot permeate into the pores of the gel. Substrances having a molecular weight lower than this critical value can be separated by GPC but substances having a molecular weight higher than this critical value cannot permeate into the pores of the gel but pass directly through clearances among the gels. Accordingly, the latter substances show substantially the same elution volume regardless of the molecular weight and, hence, these substances cannot be separated by GPC.

$M_{lim}$ can be obtained from the GPC calibration curve. The GPC calibration curve can be obtained by plotting the logarithm of the molecular weights of individual samples whose molecular weights are known on the ordinate and the elution volume of each sample on the abscissa with respect to a gel-packed column, as shown in FIG. 1. It represents the relation between the elution volume and the molecular weight of a material to be separated in the chromatogram. The inclined line and the line parallel to the ordinate in this graph are substantially straight lines, and the portion at which the two straight lines meet each other is a curve. $M_{lim}$ in this invention is expressed as the value on the ordinate at a point at which the extension of the inclined straight line crosses the extension of the line parallel to the y ordinate. $M_{lim}$ is one property which is inherent to the gel, and represents the exclusive molecular weight on which the gel can exert a separating action based on the differences in the size of molecules. Substances having a larger molecular weight than the exclusive molecular weight are eluted substantially together without being separated.

In this invention, $M_{lim}$ is determined by using, as the standard substance having a known molecular weight, polyethylene glycols or dextrans and distilled water as the solvent. Incidentally, since commercially available water-soluble standard polymers have a molecular weight lower than about 2,000,000, a complete calibration curve cannot be obtained with respect to a gel having an $M_{lim}$ exceeding 2,000,000. Therefore, the $M_{lim}$ of such a gel cannot precisely be determined but is estimated from the intersecting point where the extension of the calibration curve determined with respect to molecular weights lower than 2,000,000 crosses the extension of the line parallel to the y ordinate, which is determined under the same conditions with respect to a gel having a smaller $M_{lim}$.

In order that the gel has a mechanical strength suitable for high speed GPC and non-adsorbability in combination, the degree of crosslinking X is preferably in the range of about 0.24 to about 0.32 when $M_{lim}$ is in the range of about $10^3$ to about $10^5$, and the degree of crosslinking X is preferably in the range of about 0.27 to about 0.35 when $M_{lim}$ is in the range of about $10^5$ to about $10^8$.

Furthermore, the gel of this invention which is a totally porous hard gel, has a large specific surface area in the dry state. The totally porous structure herein means a structure having fine pores distributed even to the internal portions of particles. Generally speaking, organic synthetic polymers having a crosslinked structure will be swollen in a solvent having affinity for the polymers, and shrunk on drying. In the case of a soft gel where the pores filled with a solvent at the time of swelling are maintained only with the crosslinked network, when the gel is dried, such a network cannot maintain the swollen state and accordingly, it is shrunk and the pores mostly disappear. In such a case, the specific surface area becomes substantially the value on the outer surface of the particles, exhibiting generally a very low value less than 1 m²/g. On the other hand, in the case of a hard gel having a firm porous structure, when the gel is dried, the pores can maintain substantially the state at the time of swelling although slightly shrunk. In other words, the pores are permanent in nature. Thus, the hard gel exhibits a specific surface area by far greater than that of the soft gel.

The gel of the present invention has generally a specific surface area of about 5 to about 1000 m²/g. The gel having a specific surface area less than the lower limit of the range means that the gel has a homogeneous type structure (soft gel) hardly containing fine pores, and therefore is not suitable for high speed GPC.

The specific surface area can be measured by various conventional methods but in the present invention it is determined according to the most popular BET method using nitrogen gas. It is also necessary to sufficiently dry the samples to be used for measurement of specific surface area. Since the gel of the present invention is difficult to dry due to the high hydrophilicity, it is preferred that the wet gel is first equilibrated with acetone and then dried under reduced pressure at a temperature lower than about 60° C.

The gel of this invention generally has a weight average particle diameter (to be referred to as "$\overline{D}_w$") of about 4 to about 200 μm. Especially, excellent characteristic features as the gel for HLC are exhibited when $\overline{D}_w$ is small, for example, in the range of about 5 to about 20 μm. When a specifically high separability is required, it is preferred that the gel has a $\overline{D}_w$ of about 5 to about 12 μm. $\overline{D}_w$ is measured by a Coulter Counter (a product of Coulter Electronics Inc., U.S.A.) and calculated according to the following formula:

$$\overline{D}_w = \frac{\Sigma(n_i \cdot d_i^4)}{\Sigma(n_i \cdot d_i^3)}$$

wherein
di is the particle diameter, and
ni is the frequency of occurrence of particle diameter of di.

It is well known in the art of liquid chromatography that the separability can be improved by making the particle size of a packing smaller. However, when a solvent is passed through a column packed with the gel having a smaller particle size, the pressure loss is considerably increased as compared with the case where a gel having a greater particle size is used. Accordingly, when the mechanical strength of the gel is small, the gel is deformed or broken, thus producing an abnormally great pressure loss to make HLC using a gel having a small particle size impossible. Since the mechanical strength of the gel of the present invention can successfully be improved by controlling various properties, including the ester exchange ratio or the saponification ratio and the degree of crosslinking, the gel can stand high speeds as well as high pressures in spite of the small particle size.

The gel of this invention having the above described properties can be produced by carrying out suspension-polymerizing a monomer mixture of at least one vinyl ester of a carboxylic acid and at least one crosslinking monomer having an isocyanurate ring in the presence of a diluent which can dissolve the monomer mixture but is hardly soluble in water and ester-exchanging or saponifying the resulting copolymer particles to such an extent that the ester exchange ratio or the saponification ratio is about 0.4 to about 0.8.

The vinyl ester of a carboxylic acid which can be employed in this invention is a compound having at least one polymerizable vinyl carboxylate group and can be selected from vinyl esters of a carboxylic acid having 2 to 5 carbon atoms. Examples of such vinyl esters of the carboxylic acid include vinyl acetate, vinyl propionate, vinyl butyrate, vinyl valerate and vinyl pivalate, which may be employed singly or as a combination of two or more species. Of these vinyl esters of the carboxylic acid, vinyl acetate and vinyl propionate are particularly preferred due to the ease of the polymerization, ester exchange, saponification as well as that of the availability.

The crosslinking monomer having an isocyanurate ring which can be employed in this invention is represented by the formula:

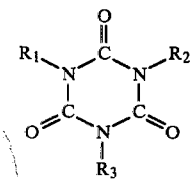

wherein
$R_1$, $R_2$ and $R_3$ may be the same or different and are selected from the groups consisting of —CH$_2$—CH=CH$_2$, —CH$_2$—C≡CH and

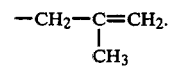

Of these crosslinking monomers, triallyl isocyanurate ($R_1 = R_2 = R_3 = $ —CH$_2$—CH=CH$_2$) has good copolymerizability with vinyl acetate and good stability in the ester exchange reaction or the saponification, and accordingly is preferred as the crosslinking monomer.

The mol ratio of the vinyl ester of the carboxylic acid to the crosslinking monomer which can be employed is generally 1 to about 0.08–about 0.22. According to the use of the gel obtained the mol ratio of the vinyl ester of the carboxylic acid to the crosslinking monomer employed is preferably 1 to about 0.11–about 0.16 or preferably 1 to about 0.12–about 0.18.

Other monomers such as 2-ethylhexyl methacrylate and acrylamide which are copolymerizable with the vinyl ester of the carboxylic acid and the crosslinking monomer may further be used in an amount, for example, up to about 3 percent by weight of the weight of the vinyl ester of the carboxylic acid, which does not substantially adversely affect the properties and the separating performance of the gel.

In order to form permanent pores in the copolymer particles and at the same time to control the amount of pores, the pore size and the distribution of pore sizes, at least one diluent which can dissolve the monomer mixture but is hardly soluble in water is added to the suspension polymerization system.

Examples of such diluents which can be employed in this invention include aromatic hydrocarbons such as toluene and xylene; aliphatic hydrocarbons such as heptane, octane, decane and decalin; ester compounds such as n-butyl acetate, iso-butyl acetate and n-hexyl acetate; methyl ethyl ketone; and n-heptanol, which may be used singly or as a combination of two or more species. A suitable amount of the diluent which can be employed in this invention is about 20 to about 200 parts by weight per 100 parts by weight of the monomer mixture. If the amount of the diluent is less than the lower limit of this range, the amount of pores in the gel is decreased too much, and the separating performance of the gel is reduced. If it is larger than the upper limit of the above-specified range, the mechanical strength of the gel is reduced, and the gel becomes unsuitable for use with small particle diameters at high pressures or high speeds. A preferred amount of the diluent is within the range of about 20 to about 100 parts by weight per 100 parts by weight of the monomer mixture.

Further, in order to control the pore size and the distribution of pore sizes of the gel, a linear polymer which is soluble in the monomer mixture may be employed in combination with the above-described diluent.

The linear polymer which can be employed in this invention is a linear polymer which can be soluble in the monomer mixture at a concentration of at least one percent by weight, and examples of such linear polymers are polyvinyl acetate and polystyrene. The amount of the linear polymer employed is generally up to about 10 parts by weight, preferably about 0.3 to about 10 parts by weight per 100 parts by weight of the monomer mixture. Use of the linear polymer in combination with the diluent can easily produce a gel having a larger pore diameter, i.e., a high $M_{lim}$.

The initiator which can be employed in the suspension polymerization of this invention may be any conventionally employed radical polymerization initiator. Exemplary radical polymerization initiators include azo type initiators such as 2,2'-azobisisobutyronitrile and 2,2'-azobis-(2,4-dimethylvaleronitrile) and peroxide type initiators such as benzoyl peroxide, lauroyl peroxide, di-t-butyl peroxide and cumene hydroperoxide. The amount of the radical polymerization initiator is generally about 0.1 to about 5 parts by weight per 100 parts by weight of the monomer mixture.

In carrying out the suspension polymerization it is preferred to add in the aqueous phase a suspension stabilizer selected from generally known organic polymeric stabilizers such as polyvinyl alcohol and methyl cellulose. The amount of the suspension stabilizer employed is generally about 0.1 to about 3 percent by weight based on the weight of water as the suspension polymerization medium. If necessary or if desired, a pH buffer agent such as sodium phosphate can be employed in combination. It is preferred to maintain the pH of the suspension solution approximately neutral. The particle size of the granular copolymer obtained by the polymerization can be varied by changing the kind and the amount of the suspension stabilizer or the stirring rate.

The volume or weight ratio between the organic phase and the aqueous phase in the suspension polymerization is not particularly critical, and may be those which are generally selected in performing suspension polymerization.

The polymerization temperature employed as generally about 50° C. to about 90° C., preferably about 60° C. to about 80° C.

The polymerization time employed is generally about 10 to about 50 hours.

After the polymerization, the resulting copolymer particles are separated by filtration, and sufficiently washed with water, hot water, acetone, etc., to remove the linear polymer, suspension stabilizer, remaining monomers, diluent, etc., adhering to the particles, and then dried.

The copolymer particles thus obtained are subjected to ester exchange reaction or saponification. The ester exchange reaction may be conducted in an alcohol such as methanol, ethanol, etc., as the solvent and the saponification may be conducted in water or a mixture of water and an alcohol such as methanol, ethanol, etc., as the solvent, each using an acid such as sulfuric acid, hydrochloric acid, etc., or an alkali such as sodium hydroxide, potassium hydroxide, etc.

The temperature of the ester exchange reaction or the saponification employed is generally about 0° C. to about 60° C. and preferably about 0° C. to about 40° C. and the time of the ester exchange reaction or the saponification employed is about 5 to about 50 hours.

In order to produce gels whose particle size is small and which stand high pressures or high speeds, it is essential in this invention that the ester exchange ratio or the saponification ratio is within the range of about 0.4 to about 0.8. If all the ester groups in the gel is ester-exchanged or saponified, i.e., if the ester exchange ratio or the saponification ratio is 1.0, there may be obtained a highly hydrophilic gel whose mechanical strength is not necessarily sufficient. A preferred ester exchange ratio or the saponification ratio is about 0.45 to about 0.75. The conditions of the ester exchange reaction or the saponification can be appropriately selected by varying the kind of the reaction solvent, the reaction temperature, the reaction time, etc.

After the ester exchange reaction or the saponification, the resulting particles are separated by filtration, and sufficiently washed with water or hot water. If required, the particles are classified to make them usable as a packing for HLC, for example, by dispersing them in water to perform simple classification utilizing the differences in the sedimentation rate.

The gel of the present invention contains, in the polymer skeleton, principally hydroxyl groups, ester groups and units of the crosslinking monomer having an isocyanurate ring and have sufficient hydrophilicity with such a hydroxyl content as within the above-mentioned range, and thus the gel does not show adsorbability for many substances dissolved in water. Accordingly, in the separation or the analysis of water-soluble synthetic polymers, saccharides or proteins, the gel has calibration curves in which the relation between the elution volume and the logarithm of the molecular weight of a material to be separated may be represented by substantially straight lines or smooth curves. Namely, the gel of this invention is useful as the GPC gel of an aqueous medium type. In the analysis of samples consisting of various kinds of components such as serum or urine by using the gel of the present invention, however, there are observed some components weakly adsorbed onto the gel, thus indicating an elution volume higher than that as anticipated from their molecular weight. As the result, a number of peaks can be detected. Moreover, the gel shows hardly any adsorbability of proteins such as alubumin and elutes the proteins in a volume corresponding to their molecular weight. Therefore, according to the analysis of serum or urine by using the gel of the present invention, it is not necessary to remove proteins and the process can very simply be carried out with a large amount of information obtained. Since the gel of this invention contains hydroxyl groups, ester groups and units of the crosslinking monomer having an isocyanurate ring at appropriate ratios, it may be assumed that a little adsorbability is imparted to the gel in addition to the separation action based on the differences in the size of molecules as intended by the present invention, resulting in the good separation as described above.

The gel of the present invention, in addition to such a chemical structure, has also very great mechanical strength with a $W_R$ controlled within the above-mentioned range. Therefore, in spite of the small particle sizes, the gel of this invention can stand high pressures and high speeds. It is required for the gel of an aqueous medium type for high speed GPC at least (1) to have pores in the gel, (2) to have a small adsorbability and (3) to have a mechanical strength sufficient to stand high pressures or high speeds even with small particle sizes. The gel of the present invention can satisfy these requirements and these characteristic features can be attained by satisfying the above-specified ranges of the X, ester exchange ratio or saponification ratio and $W_R$, respectively.

For example, such excellent separation characteristic features and mechanical strength as described above cannot be exhibited by the gel having a structure of a copolymer of vinyl alcohol and triallyl isocyanurate where X is low and the absorption of infrared absorption spectrum at 1730 cm$^{-1}$ has completely disappeared, as is disclosed in British Pat. No. 2034328 A. Accordingly, such a gel is not suitable as a packing for HLC.

The pore size of the gel of this invention can be controlled within a wide range. Thus the gel of this invention is useful not only for the separation or the analysis of water-soluble synthetic polymers, saccharides or proteins but also for the analysis of components having a molecular weight of several hundred thousand to several million present in blood and urine which are said to be closely related with diseases of kidney or liver or symptoms such as carcinoma. Moreover, since the gel of this invention is endowed with excellent characteristic features as a high speed GPC gel as described above, these analyses can be accomplished within a short period time and there can also be obtained much information.

The gel of the present invention may be employed generally in a state packed in a column. The column employed is usually a cylinder made of stainless steel, but any other column may be selected depending on the purpose.

The present invention will now be illustrated in greater detail with reference to several Examples, but they are given for illustrative purposes only and are not to be construed as limiting the invention.

EXAMPLE 1

A uniform liquid mixture consisting of 100 g of vinyl acetate, 32.2 g (X=0.25) of triallyl isocyanurate, 100 g of n-butyl acetate and 3.3 g of 2,2'-azobisisobutyronitrile, and 800 ml of an aqueous solution containing 1% by weight of a polyvinyl alcohol having a degree of polymerization of about 2400 and a saponification ratio of 88% by mol, 0.05% by weight of sodium dihydrogenphosphate dihydrate and 1.5% by weight of disodium hydrogenphosphate dodecahydrate were charged in a 2 l flask. After thorough mixing, suspension polymerization was conducted with stirring under heating at 65° C. for 18 hours and subsequently at 75° C. for 5 hours. The resulting polymer particles were separated by filtration, washed with water and then with acetone, dried and subsequently subjected to ester exchange reaction in a solution consisting of 47 g of sodium hydroxide and 2 l of methanol at 15° C. for 20 hours. The resulting polymer particles were recovered by filtration, washed with water and dispersed in water to perform simple classification utilizing the difference in the sedimentation rate.

Figure 2:
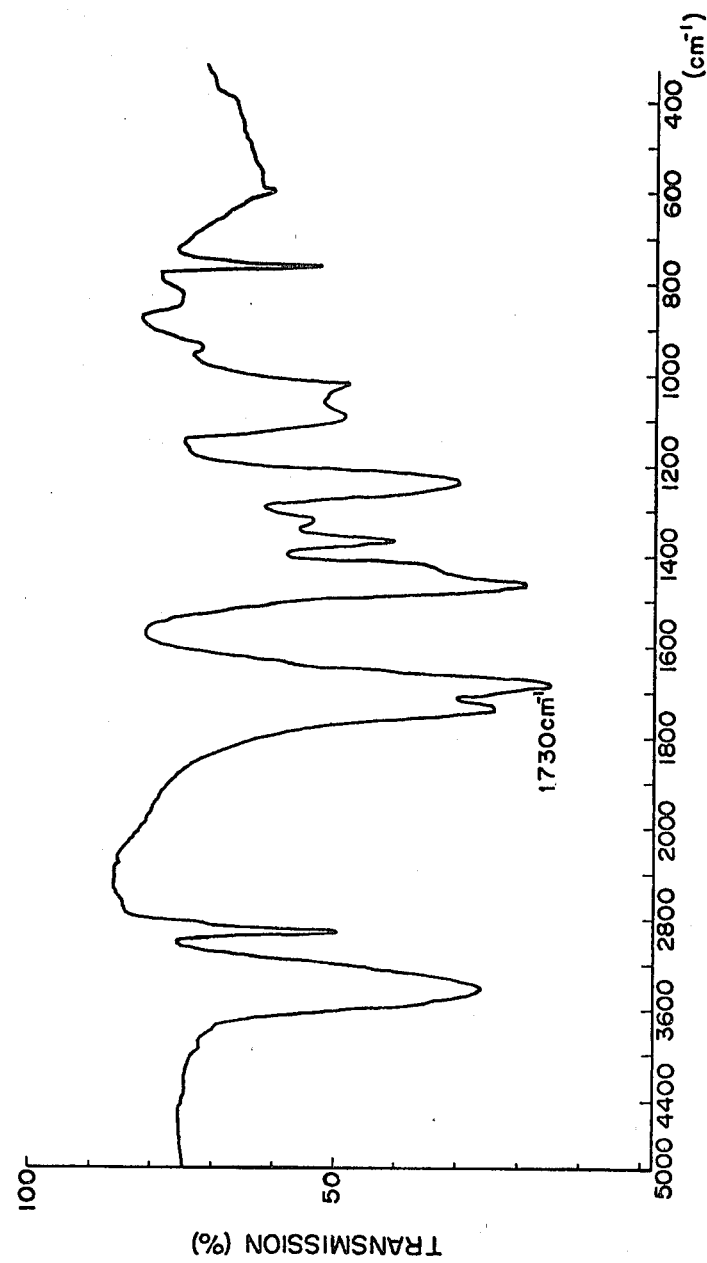
FIG. 2 is an infrared absorption spectrum of the gel in Example 1.

The weight average particle diameter ($\overline{D}w$) of the crosslinked polyvinyl alcohol gel thus obtained was measured using a Coulter Counter ZB type (a product of Coulter Electronics Co., U.S.A.), and was found to be 10.0 μm. The density of hydroxyl groups ($q_{OH}$) was determined by the method as described above and was found to be 7.3 meg/g, indicating an ester exchange ratio of 0.64. It was also confirmed by the infrared absorption spectrum of the gel after the ester exchange reaction as shown in FIG. 2 that there remained ester groups in the skeleton of the polymer. The infrared spectrum was measured by forming the gel into KBr tablets using a JASCO infrared spectrophotometer A320 type (a product of Japan Spectroscopic Co., Ltd., Japan). The gel had a water regain of 1.58 g·water/g·dry gel and a specific surface area of 95 m$^2$/g.

This gel was packed in a stainless steel column having a diameter of 7.5 mm and a length of 50 cm and aqueous solutions of dextrans and polyethylene glycols having various molecular weights were measured using, as the detector, a differential refractometer ("Shodex RI Model SE-11," a product of Showa Denko Kabushiki Kaisha, Japan). As the result, the substances of each group were eluted in the order of a higher molecular weight and it was confirmed that the separation by GPC had been performed. In the analysis the pump and the sample injector employed were those of Hitachi Model 635A (a product of Hitachi Ltd., Japan) and the detector employed was Shodex RI Model SE-11. The exclusive molecular weight ($M_{lim}$) for dextran was about $3 \times 10^4$. When analysis of γ-globulin, bovine serum alubumin, ovalubumin and myoglobin was conducted by using, as the solvent, an aqueous solution containing 0.3 M of sodium chloride and 0.1 m of sodium phosphaste and a ultraviolet-absorption detector ("Multi-Wavelength UV Monitor," a product of Hitachi Ltd., Japan), the proteins were eluted in the order of the protein having a higher molecular weight with a recovery rate of substantially 100%. All the samples were measured at a flow rate of 1 ml/minute.

Figure 3:
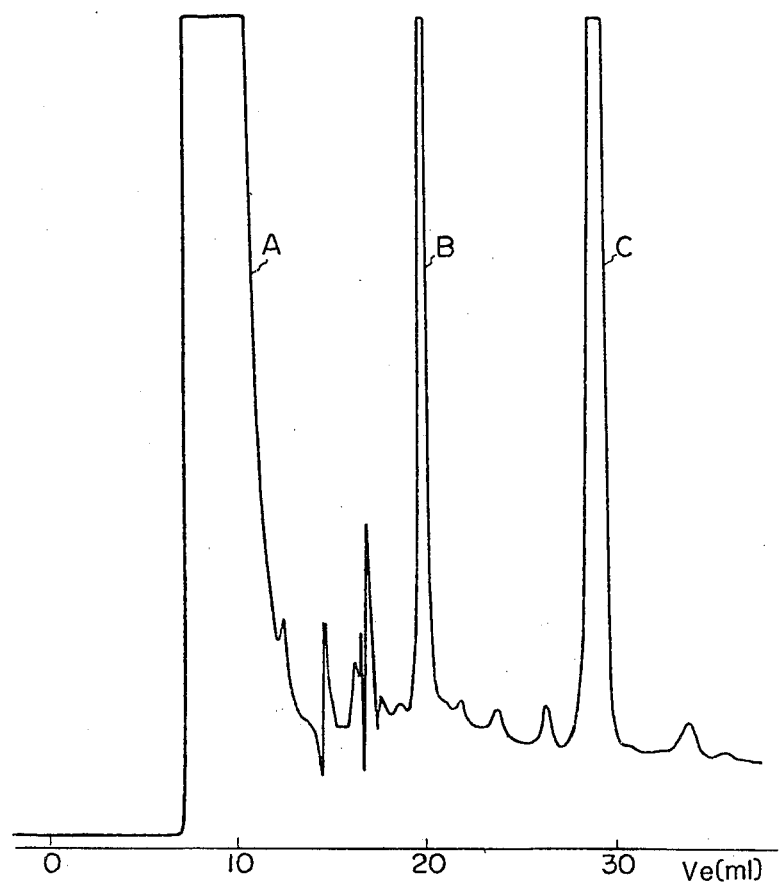
FIGS. 3 to 5 are chromatograms obtained using the gels in Examples 1, 2 and 5.

Furthermore, a sample solution of freeze-dried human serum (trade name "ORTHO" Normal Control Serum, a product of Ortho Diagnostics Inc.) was analyzed using the packed column to give a chart as shown in FIG. 3 where the peak A indicates principally alubumin, the peak B creatinine and the peak C uric acid. Some components were eluted in a greater amount than the vacant volume of the column due to their weak absorbability to the gel but a number of the components were detected and separated after the elution of γ-globulin and alubumin.

EXAMPLE 2

A gel was prepared in the same manner as in Example 1 except that a liquid mixture consisting of 100 g of vinyl acetate, 32.2 g (X=0.25) of triallyl isocyanurate, 40 g of toluene and 3.3 g of 2,2'-azobisisobutyronitrile was employed instead of the liquid mixture of Example 1 and that the ester exchange reaction was conducted at 40° C. for 20 hours.

The resulting gel had a $\overline{D}w$ of 9.5 μm, a $q_{OH}$ of 9.0 meq/g (an ester exchange ratio of 0.74), a $W_R$ of 1.0 g·water/g·dry gel and a specific surface area of 38 m$^2$/g.

Figure 4:
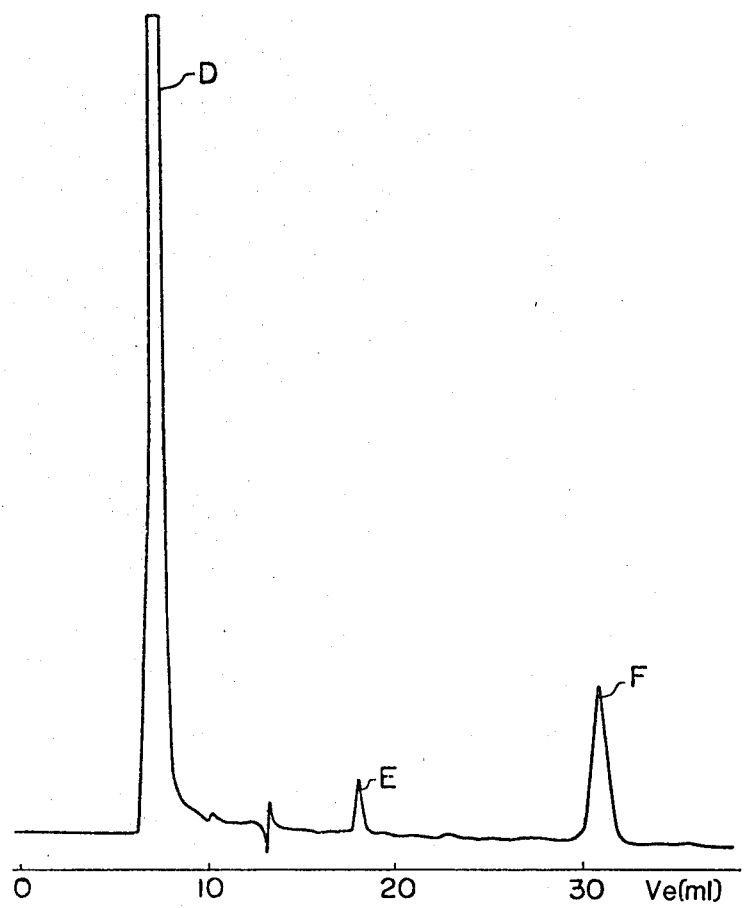

This gel was packed in the same column as in Example 1 and analysis of polyethylene glycols having various molecular weights was conducted using the packed column. As the result, it was confirmed that the elution order was with the polyethylene glycol having a higher molecular weight and the $M_{lim}$ was $1.9 \times 10^3$. All the samples were measured at a flow rate of 1 ml/minute and each analysis was completed within 20 minutes. Furthermore, a sample solution of freeze-dried human serum was analyzed using the packed column to give a chart as shown in FIG. 4 where the peak D indicates principally alubumin, the peak E creatinine and the peak F uric acid. Although the number of peaks may apparently be smaller than that in FIG. 3 due to the lower sensitivity of measurement, the basic pattern of the elution curve is almost the same as that of FIG. 3. Thus it was confirmed that a number of the components could be detected and separated by the gel of this Example.

Example 3

A gel was prepared in the same manner as in Example 1 except that a liquid mixture consisting of 100 g of vinyl acetate, 37.5 g (X=0.28) of triallyl isocyanurate, 100 g of n-butyl acetate and 4.1 g of a polyvinyl acetate having a degree of polymerization of about 500 and 3.4 g of 2,2'-azobisisobutyronitrile was employed instead of the liquid mixture of Example 1 and that the ester exchange reaction was conducted at 15° C. for 15 hours.

The resulting gel had a $\overline{D}w$ of 9.1 μm, a $q_{OH}$ of 5.1 meq/g (an ester exchange ratio of 0.50), a $W_R$ of 1.46 g·water/g·dry gel and a specific surface area of 86 m$^2$/g.

This gel was packed in the same column as in Example 1 and analysis of polyethylene glycols and dextrans having various molecular weight and proteins including γ-globulin was conducted using the packed column. As the result, it was confirmed that the substances of each group were eluted in the order of the substance having a higher molecular weight and that the proteins were eluted with a recovery rate of substantially 100%. The $M_{lim}$ for dextran was $8 \times 10^4$. All the samples were measured at a flow rate of 1 ml/minute and each analysis was completed within 20 minutes.

EXAMPLE 4

A gel was prepared in the same manner as in Example 1 except that a liquid mixture consisting of 116 g of vinyl propionate, 39.4 g (X=0.29) of triallyl isocyanurate, 62 g of n-butyl acetate and 3.9 g of 2,2'-azobisisobutyronitrile was employed instead of the liquid mixture of Example 1 and that the ester exchange reaction was conducted at 40° C. for 20 hours.

The resulting gel had a $\overline{D}w$ of 10.8 μm, a $q_{OH}$ of 7.7 meq/g (an ester exchange ratio of 0.72), a $W_R$ of 1.30 g·water/g·dry gel and a specific surface area of 52 m$^2$/g.

This gel was packed in the same column as in Example 1 and analysis of polyethylene glycols and dextrans having various molecular weights and proteins including 65-globulin was conducted using the packed column. As the result, it was confirmed that the substances of each group were eluted in the order of the substance having a higher molecular weight and that the proteins were eluted with a recovery rate of substantially 100%. The $M_{lim}$ for dextran was $2 \times 10^4$. All the samples were measured at a flow rate of 2 ml/minute and each analysis was completed within 10 minutes.

EXAMPLE 5

A gel was prepared in the same manner as in Example 1 except that a liquid mixture consisting of 100 g of vinyl acetate, 41 g (X=0.3) of triallyl isocyanurate, 141 g of methyl isobutyl ketone and 2.8 g of 2,2'-azobisisobutyronitririle was employed instead of the liquid mixture of Example 1 and that the ester exchange reaction was conducted at 40° C. for 20 hours.

The resulting gel had a $\overline{D}w$ of 12.1 μm, a $q_{OH}$ of 7.8 meq/g (an ester exchange ratio of 0.62), a $W_R$ of 1.78 g.water/g·dry gel and a specific surface area of 87 m$^2$/g.

Figure 5:
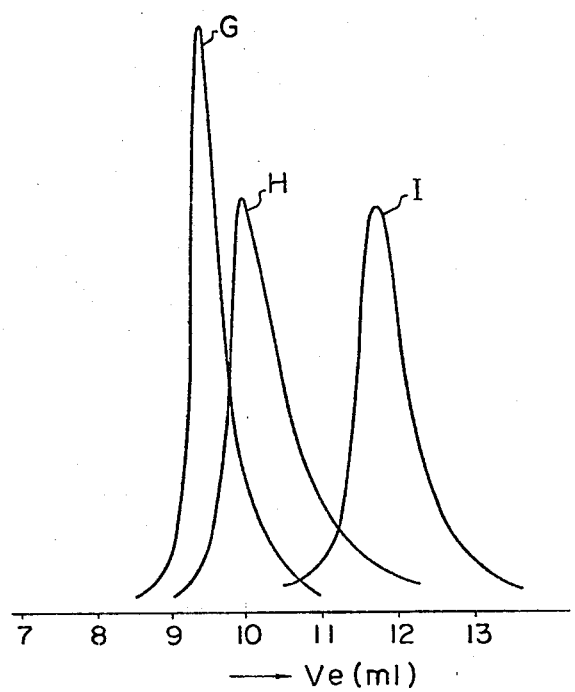

This gel was packed in the same column as in Example 1 and analysis of standard samples of polyethylene glycols and dextrans having various molecular weights was conducted using the packed column. As the result, the substances of each group were eluted in the order of the substance having a higher molecular weight and the $M_{lim}$ for dextran was $5 \times 10^4$. Also analysis of standard samples of bovine serum alubumin, ovalubumin and myoglobin was conducted using the packed column to find that these proteins were eluted in the order of the protein having a higher molecular weight and with a recovery rate of substantially 100% and the chart obtained is shown in FIG. 5 where the curve G shows an elution curve of alubumin, the curve H an elution curve of ovalubumin and the curve I an elution curve of myoglobin. As clearly seen from these results, the gel of this Examples is found to be very effective for the separation of proteins. All the samples were measured at a flow rate of 1 ml/minute and each analysis was completed within 20 minutes.

EXAMPLE 6

A gel was prepared in the same manner as in Example 1 except that a liquid mixture consisting of 100 g of vinyl acetate, 48 g (X=0.33) of triallyl isocyanurate, 104 g of n-heptanol and 3.7 g of 2,2'-azobisisobutyronitrile was employed instead of the liquid mixture of Example 1.

The resulting gel had a $\overline{D}w$ of 9.7 μm, a $q_{OH}$ of 4.4 meq/g (an ester exchange ratio of 0.47), a $W_R$ of 1.5 g·water/g·dry gel and a specific surface area of 60 m²/g.

This gel was packed in the same column as in Example 1 and analysis of polyethylene glycols and dextrans having various molecular weights was conducted using the packed column. As the result, they were eluted in the order of a high molecular weight. The $M_{lim}$ for dextran was $5 \times 10^5$. All the samples were measured at a flow rate of 1 ml/minute and each analysis was completed within 20 minutes.

EXAMPLE 7

A gel was prepared in the same manner as in Example 1 except that a liquid mixture consisting of 100 g of vinyl acetate, 52 g (X=0.35) of triallyl isocyanurate, 122 g of n-butyl acetate, 6 g of polyvinyl acetate having a degree of polymerization of about 500 and 3.8 g of 2,2'-azobisisobutyronitrile was employed instead of the liquid mixture of Example 1 and that the ester exchange reaction was conducted at 40° C. for 20 hours.

The resulting gel had a Dw of 11.4 μm, a $q_{OH}$ of 7.6 meq/g (an ester exchange ratio of 0.75), a $W_R$ of 1.65 g·water/g·dry gel and a specific surface area of 95 m²/g.

This gel was packed in the same column as in Example 1 and analysis of polyethylene glycols and dextrans having various molecular weights and proteins such as bovine serum alubumin, ovalubumin and myoglobin as the standard samples was conducted using the packed column. As the result, it was confirmed that the substances of each group were eluted in the order of the substance having a higher molecular weight and that the recovery rate of the proteins was substantially 100%. The $M_{lim}$ for dextran was estimated to be $2 \times 10^6$. All the samples were measured at a flow rate of 1 ml/minute and each analysis was completed within 20 minutes.

EXAMPLE 8

A gel was prepared in the same manner as in Example 1 except that a liquid mixture consisting of 100 g of vinyl acetate, 64 g (X=0.4) of triallyl isocyanurate, 164 g of n-butyl acetate, 8.2 g of polyvinyl acetate having a degree of polymerization of about 500 and 4.1 g of 2,2'-azobisisobutyronitrile was employed instead of the liquid mixture of Example 1 and that the ester exchange reaction was conducted at 40° C. for 20 hours.

The resulting gel had a $\overline{D}w$ of 11.8 μm, a $q_{OH}$ of 5.2 meq/g (an ester exchange ratio of 0.6), a $W_R$ of 1.85 g·water/g·dry gel and a specific surface area of 120 m²/g.

This gel was packed in the same column as in Example 1 and analysis of polyethylene glycols and dextrans having various molecular weights and preteins such as alubumin, ovalubumin and myoglobin was conducted using the packed column. As the result, it was confirmed that the substances of each group were eluted in the order of the substance having a higher molecular weight and that the recovery rate of the proteins was substantially 100%. The $M_{lim}$ for dextran was estimated to be $1 \times 10^7$. All the samples were measured at a flow rate of 1 ml/minute and each analysis was completed within 20 minutes.

EXAMPLE 9

A gel was prepared in the same manner as in Example 1 except that a liquid mixture consisting of 100 g of vinyl acetate, 37.5 g (X=0.28) of triallyl isocyanurate, 69 g of n-butyl acetate, 69 g of decalin (a mixture of cis- and trans-isomers), 4 g of polyvinyl acetate having a degree of polymerization of about 500 and 3.4 g of 2,2'-azobisisobutyronitrile was employed instead of the liquid mixture of Example 1 and that the ester exchange reaction was conducted at 40° C. for 20 hours.

The resulting gel had a $\overline{D}w$ of 14.5 g, a $q_{OH}$ of 8.5 meq/g (an ester exchange ratio of 0.74), a $W_R$ of 1.98 g·water/g·dry gel and a specific surface area of 80 m²/g.

This gel was packed in the same column as in Example 1 and analysis of polyethylene glycols and dextrans having various molecular weights and proteins including γ-globulin, ovalumin and myoglobin as the standard samples for protein was conducted using the packed column. As the result, it was confirmed that the substances of each group were eluted in the order of the substance having a higher molecular weight and that the recovery rate of the proteins was substantially 100%. The $M_{lim}$ for dextran was $1 \times 10^6$. All the samples were measured at a flow rate of 1 ml/minute and each analysis was completed within 20 minutes.

COMPARATIVE EXAMPLE 1

A gel was prepared in the same manner as in Example 1 except that the saponification was conducted at 60° C. for 20 hours in a solution consisting of 60 g of sodium hydroxide, 100 g of water and 500 ml of methanol instead of the ester exchange reaction of Example 1.

The resulting gel had a $\overline{D}w$ of 9.7 μm, a $q_{OH}$ of 13.5 meq/g (an ester exchange ratio of 0.98) and a $W_R$ of 1.95 g·water/g·dry gel. According to the infrared absorption spectrum of the gel the absorption due to the ester group at 1730 cm$^{-1}$ completely disappeared.

This gel was packed in the same column as in Example 1 and analysis was conducted under the same chromatographic conditions as in Example 1 but the pressure loss through the column was increased too high for measurement due to the insufficient mechanical strength of the gel.

COMPARATIVE EXAMPLE 2

A gel was prepared in the same manner as in Example 1 except that the ester exchange reaction was conducted at 0° C. for 5 hours.

The resulting gel had a $\overline{D}w$ of 9.0 μm, a $q_{OH}$ of 3.2 meq/g (an ester exchange ratio of 0.33) and a $W_R$ of 1.24 g·water/g·dry gel.

The gel had a high mechanical strength and a solvent could be passed through the same column as in Example 1 packed with this gel at a flow rate of 1 l/minute or higher but analysis of γ-globulin was unsuccessful due to the abnormally great eluted volume and the recovery ratio was also low.

COMPARATIVE EXAMPLE 3

A uniform liquid mixture consisting of 90 g of vinyl acetate, 4.5 g (X=0.017) of triallyl isocyanurate, 60 g of toluene and 0.9 g of benzoyl peroxide, and 210 g of an aqueous solution containing 2% of a polyvinyl alcohol having a polymerization degree of 500 and a saponification ratio of 89% were charged in to a 1 l flask, and suspension polymerization was carried out at 60° C. for 16 hours. The resulting polymer particles were separated by filtration, washed with water and acetone, dried and subsequently subjected to saponification in a liquid mixture of 50 g of sodium hydroxide, 100 g of methanol and 100 g of water at 60° C. for 30 hours.

The resulting gel had a Dw of 14.8 μm, a $q_{OH}$ of 18.2 meq/g (a saponification ratio of 0.90), a $W_R$ of 3.31 g·water/g·dry gel and a specific surface area of 0.1 m²/g, thus indicating that there was hardly any pore within the gel in the dry state.

This gel was packed in the same column as in Example 1 and analysis was conducted under the same chromatographic conditions as in Example 1 but the pressure loss through the column was increased too high for measurement due to the insufficient mechanical strength of the gel.

COMPARATIVE EXAMPLE 4

A gel was prepared in the same manner as in Example 1 except that a liquid mixture consisting of 50 g of vinyl acetate, 73 g (X=0.6) of triallyl isocyanurate, 123 g of n-butyl acetate and 3 g of 2,2'-azobisisobutyronitrile was employed instead of the liquid mixture of Example 1 and that the ester exchange reaction was conducted at 40° C. for 20 hours.

The resulting gel had a $\overline{D}w$ of 9.2 μm, a $q_{OH}$ of 3.3 meq/g (an ester exchange ratio of 0.61) and a $W_R$ of 1.4 g·water/g·dry gel.

This gel was packed in the same column as in Example 1 and analysis of bovine serum alubumin, ovalubumin and myoglobin as the standard samples was conducted but they were all adsorbed on to the gel with hardly any elution and any peak could not be detected.

COMPARATIVE EXAMPLE 5

A gel was prepared in the same manner as in Example 1 except that a liquid mixture consisting of 100 g of vinyl acetate, 11 g (X=0.1) of triallyl isocyanurate, 44 g of toluene and 2.8 g of 2,2'-azobisisoobutyronitrile was employed instead of the liquid mixture of Example 1.

The resulting gel had a Dw of 10.1 μm, a $q_{OH}$ of 12.5 meq/g (an ester exchange ratio of 0.78) and a $W_R$ of 1.97 g·water/g·dry gel.

This gel was packed in the same column as in Example 1 and analysis was conducted under the same chromatographic conditions as in Example 1 but the pressure loss through the column was increased too high for measurement due to the insufficient mechanical strength of the gel.

While the invention has been described in detail and with reference to specific embodiments thereof, it will be apparent to one skilled in the art that various changes and modifications can be made therein without departing from the spirit and scope thereof.

What is claimed is:

1. A porous packing for high speed liquid chromatography comprising homogeneously porous crosslinked copplymer granules essentially consisting of (I) units of vinyl alcohol, (II) units of at least one vinyl ester of a carboxylic acid and (III) units of at least one crosslinking monomer having an isocyanurate ring, the ratio of the units (I) to the units (II) in the copolymer being within the range satisfying the following equation:

about $0.4 \leq a/(a+b) \leq$ about 0.8 wherein
a and b are molar ratios of the units (I) and (II), respectively, in the total units (I), (II) and (III) of the copolymer.

2. The packing of claim 1, wherein the ratio of the units (I) to the units (II) in the copolymer is within the range satisfying the following equation:

about $0.45 \leq a/(a+b) \leq$ about 0.75.

3. The packing of claim 1, wherein the ratio of the units (I), (II) and (III) in the copolymer is within the range satisfying the following equation:

about $0.20 \leq 3c/(a+b+3c) \leq$ about 0.40 wherein
a and b are the same as defined above, and
c is the molar ratio of the units (III) in the total units (I), (II) and (III) of the copolymer.

4. The packing of claim 1 or claim 3, wherein the units of the vinyl ester of a carboxylic acid are those of the vinyl ester of a carboxylic acid having 2 to 5 carbon atoms.

5. The packing of claim 4, wherein the vinyl ester of the carboxylic acid is selected from the group consisting of vinyl acetate, vinyl propionate, vinyl butyrate, vinyl valerate and vinyl pivalate.

6. The packing of claim 6, wherein the vinyl ester of the carboxylic acid is vinyl acetate.

7. The packing of claim 5, wherein the vinyl ester of the carboxylic acid is vinyl propionate.

8. The packing of claim 1 or claim 3, wherein the units of the crosslinking monomer having an isocyanurate ring are those of the crosslinking monomer having the formula:

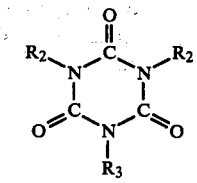

wherein
$R_1$, $R_2$ and $R_3$ may be the same or different and are selected from the group consisting of —CH<sub>2</sub>—CH=CH<sub>2</sub>, —CH—C≡CH and

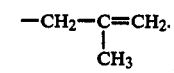

9. The packing of claim 8, wherein the crosslinking monomer is triallyl isocyanurate.

10. A packing of claim 3, wherein the ratio of the units (I), (II) and (III) is within the range satisfying the following equation:

about $0.24 \leq 3c/(a+b+3c) \leq$ about 0.32 wherein
a, b and c are the same as defined above,
and the exclusive molecular weight for polyethylene glycol or dextran is in the range of about 10³ to about 10⁵.

11. A packing of claim 3, wherein the ratio of the units (I), (II) and (III) is within the range satisfying the following equation:

about $0.27 \leq 3c/(a+b+3c) \leq$ about 0.35 wherein
a, b and c are the same as defined above, and the exclusive molecular weight for polyethylene glycol or dextran is in the range of about $10^5$ to about $10^8$.

12. The packing of claim 1 having a water regain of about 0.5 to about 2.0 g·water/g·dry gel.

13. The packing of claim 12, wherein the water regain is in the range of about 0.8 to about 2.0 g·water/g·dry gel.

14. The packing of claim 1, wherein the copolymer has a weight average particle diameter of about 5 to about 20 μm.

15. The packing of claim 14, wherein the copolymer has a weight average particle diameter of about 5 to about 12 μm.

16. A process for producing a packing for high speed liquid chromatography, which comprises subjecting a monomer mixture of at least one vinyl ester of a carboxylic acid having 2 to 5 carbon atoms and at least one crosslinking monomer having the formula:

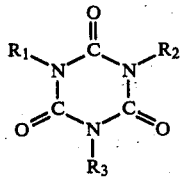

wherein
R$_1$, R$_2$ and R$_3$ may be the same or different and are selected from the groups consisting of —CH$_2$—CH=CH$_2$, —CH$_2$—C≡CH and

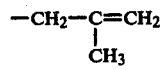

to suspension polymerization and subjecting the resulting granular copolymer to ester exchange reaction or saponification to such an extent that the ester exchange ratio or the saponification ratio is about 0.4 to about 0.8.

17. The process of claim 16, wherein the ester exchange ratio or the saponification ratio is about 0.45 to about 0.75.

18. The process of claim 16, wherein the mol ratio of the vinyl ester of the carboxylic acid to the crosslinking monomer is 1 to about 0.08–about 0.22.

19. The process of claim 18, wherein the mol ratio of the vinyl ester of the carboxylic acid to the crosslinking monomer is 1 to about 0.11–about 0.16.

20. The process of claim 18, wherein the mol ratio of the vinyl ester of the carboxylic acid to the crosslinking monomer is 1 to about 0.12–about 0.18.

21. The process of claim 16, wherein the vinyl ester of the carboxylic acid is selected from the group consisting of vinyl acetate, vinyl propionate, vinyl butyrate, vinyl valerate and vinyl pivalate.

22. The process of claim 21, wherein the vinyl ester of the carboxylic acid is vinyl acetate.

23. The process of claim 21, wherein the vinyl ester of the carboxylic acid is vinyl propionate.

24. The process of claim 16, wherein the crosslinking monomer is triallyl isocyanurate.

* * * * *

UNITED STATES PATENT AND TRADEMARK OFFICE
CERTIFICATE OF CORRECTION

PATENT NO. : 4,368,275

DATED : January 11, 1983

INVENTOR(S) : Yuzo Tanagihara et al

It is certified that error appears in the above—identified patent and that said Letters Patent is hereby corrected as shown below:

| | |
|---|---|
| Col. 6, lines 16, 17 | Delete "substrances" and insert --substances-- |
| Col. 10, line 9 | After "employed" delete "as" and insert --is-- |
| Col. 12, line 59 | After "0.1" delete "m" and insert --M-- |
| Col. 14, line 17 | Before "-globulin" delete "65" and insert -- $\gamma$ -- |
| Col. 17, line 1 | Delete "Dw" and insert --$\bar{D}w$-- |
| Col. 17, line 34 | Delete "azobisisoobutyronitrile" and insert --azobisisobutyronitrile-- |
| Col. 17, line 36 | Delete "Dw" and insert --$\bar{D}w$-- |
| Col. 17, line 53 | Delete "copplymer" and insert --copolymer-- |
| Col. 18, line 43 | After comma delete "-CH-C≡CH" and insert -- $-CH_2-C\equiv CH$ -- |

Signed and Sealed this

Twelfth Day of April 1983

[SEAL]

Attest:

Attesting Officer

GERALD J. MOSSINGHOFF

Commissioner of Patents and Trademarks